(12) United States Patent
Shukl et al.

(10) Patent No.: US 11,176,216 B2
(45) Date of Patent: Nov. 16, 2021

(54) CONTEXT AWARE PERSONALIZED QUERY AUTOCOMPLETION

(71) Applicant: Microsoft Technology Licensing, LLC, Redmond, WA (US)

(72) Inventors: Vinayak Shukl, New Delhi (IN); Nagaraj Kota, Bangalore (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 284 days.

(21) Appl. No.: 16/369,314

(22) Filed: Mar. 29, 2019

(65) Prior Publication Data

US 2020/0311165 A1 Oct. 1, 2020

(51) Int. Cl.
*G06F 16/00* (2019.01)
*G06F 16/9537* (2019.01)
*G06F 16/9535* (2019.01)
*G06F 40/30* (2020.01)
*G06F 40/274* (2020.01)

(52) U.S. Cl.
CPC ...... *G06F 16/9537* (2019.01); *G06F 16/9535* (2019.01); *G06F 40/274* (2020.01); *G06F 40/30* (2020.01)

(58) Field of Classification Search
CPC ............. G06F 16/9535; G06F 16/9537; G06F 40/274; G06F 40/30
See application file for complete search history.

(56) References Cited

U.S. PATENT DOCUMENTS

| 8,825,571 | B1* | 9/2014 | Alfonseca | G06N 5/022 706/12 |
| 8,930,350 | B1* | 1/2015 | Herscovici | G06F 16/3322 707/723 |
| 9,767,183 | B2* | 9/2017 | Su | G06F 16/3322 |
| 2009/0119289 | A1 | 5/2009 | Gibbs et al. | |
| 2010/0211588 | A1* | 8/2010 | Jiang | G06F 16/3322 707/768 |

(Continued)

OTHER PUBLICATIONS

"Bing Autosuggest", Retrieved from: https://azure.microsoft.com/en-in/services/cognitive-services/autosuggest/, Retrieved Date: Dec. 14, 2019, 9 Pages.

(Continued)

*Primary Examiner* — Shew Fen Lin
(74) *Attorney, Agent, or Firm* — Schwegman Lundberg & Woessner, P.A.

(57) ABSTRACT

In some embodiments, a computer system detects user-entered text that has been entered in a search field of a search engine via a user interface of a computing device of a user, determines a context representation for the user-entered text based on one or more search queries submitted by the user within a particular amount of time before the user-entered text was entered, generates a corresponding score for each one of a plurality of auto-completion candidates based on the auto-completion candidate and the context representation, and causes at least a portion of the plurality of auto-completion candidates to be displayed in an auto-complete user interface element of the search field based on the corresponding scores of the at least a portion of the plurality of auto-completion candidates prior to the user-entered text being submitted by the user as part of a search query.

19 Claims, 9 Drawing Sheets

(56) References Cited

U.S. PATENT DOCUMENTS

2013/0046777 A1* 2/2013 Mohiuddin ......... G06F 16/3325
  707/767

OTHER PUBLICATIONS

"Language model", Retrieved from: http://web.archive.org/web/20190120164729/https://en.wikipedia.org/wiki/Language_model, Retrieved Date: Jan. 20, 2019, 5 Pages.

"Latent Dirichlet Allocation", Retrieved from: http://web.archive.org/web/20181212221804/https://en.wikipedia.org/wiki/Latent_Dirichlet_allocation, Retrieved Date: Dec. 12, 2018, 6 Pages.

"Query Likelihood Model", Retrieved from: https://en.wikipedia.org/wiki/Query_likelihood_model, Retrieved Date: Dec. 14, 2019, 2 Pages.

Ahmad, et al., "Multi-Task Learning for Document Ranking and Query Suggestion", In Proceedings of 6th International Conference on Learning Representations, Feb. 15, 2018, pp. 1-14.

Baeza-Yates, et al., "Query Recommendation using Query Logs in Search Engines", In Proceedings of the International Conference on Current Trends in Database Technology, Mar. 14, 2004, 10 Pages.

Craswell, et al., "Random Walks on the Click Graph", In Proceedings of the 30th Annual International ACM SIGIR Conference on Research and Development in Information Retrieval, Jul. 23, 2007, 8 Pages.

Fan, et al., "Suggesting Topic-Based Query Terms as You Type", In Proceedings of the 12th International Asia-Pacific Web Conference, Apr. 6, 2010, pp. 61-67.

Jiang, et al., "Learning Query and Document Relevance from a Web-scale Click Graph", In Proceedings of the 39th International ACM SIGIR conference on Research and Development in Information Retrieval, Jul. 17, 2016, pp. 185-194.

Li, et al., "Exploring Query Auto-Completion and Click Logs for Contextual-Aware Web Search and Query Suggestion", In Proceedings of the 26th International Conference on World Wide Web, Apr. 3, 2017, pp. 539-548.

* cited by examiner

CONTEXT AWARE PERSONALIZED QUERY AUTOCOMPLETION

TECHNICAL HELD

The present application relates generally to systems, methods, and computer program products for context aware personalized query auto-completion to improve user interface functionality and other functional aspects of a computer system.

BACKGROUND

Auto-completion, also known as word completion, is a feature in which an application predicts the rest of a word that a user is typing and presents the predicted word to the user for use by the user, such as in the submission of a search query. Current auto-completion solutions suffer from technical problems, as they do not sufficiently consider the specific user that is entering the word or the context in which the specific user is entering the word. The lack of personalization and context awareness in current auto-completion solutions leads to a lack of relevance with respect to the particular user entering the word. As a result, significant amounts of area on the graphical user interface of the computer system with which the user is engaging are being consumed with irrelevant auto-completion suggestions, thereby wasting important electronic resources of the computer system and negatively affecting computer functionality. Other technical problems may arise as well, as will be discussed below.

BRIEF DESCRIPTION OF THE DRAWINGS

Some embodiments of the present disclosure are illustrated by way of example and not limitation in the figures of the accompanying drawings, in which like reference numbers indicate similar elements.

DETAILED DESCRIPTION

I. Overview

Example methods and systems of context aware personalized query auto-completion are disclosed. In the following description, for purposes of explanation, numerous specific details are set forth in order to provide a thorough understanding of example embodiments. It will be evident, however, to one skilled in the art that the present embodiments may be practiced without these specific details.

Some or all of the above problems may be addressed by one or more example embodiments disclosed herein, which provide a system and method for context aware personalized auto-completion. In some example embodiments, a computer system is configured to solve the above technical problems by implementing a technical solution in which the computer system determines a context in which a user is entering text into a search field based on search queries that the user has previously submitted within a particular amount of time (e.g., 30 minutes) before the currently-entered text. The computer system then generates corresponding scores for auto-completion candidates based on the determined context and causes at least a portion of the auto-completion candidates to be displayed in an auto-completion user interface element of the search field based on the corresponding scores of the auto-completion candidates prior to the user-entered text being submitted by the user as part of a search query.

The implementation of the features disclosed herein involves a non-generic, unconventional, and non-routine operation or combination of operations. By applying one or more of the solutions disclosed herein, some technical effects of the system and method of the present disclosure are to provide a specially configured computer system that personalizes the auto-completion suggestions for a user, improving their relevance to the user, and avoiding waste of important user interface display area. As a result, the functioning of the computer system is improved. Other technical effects will be apparent from this disclosure as well.

II. Detailed Example Embodiments

The methods or embodiments disclosed herein may be implemented as a computer system having one or more modules (e.g., hardware modules or software modules). Such modules may be executed by one or more processors of the computer system. The methods or embodiments disclosed herein may be embodied as instructions stored on a machine-readable medium that, when executed by one or more processors, cause the one or more processors to perform the instructions.

Figure 1:
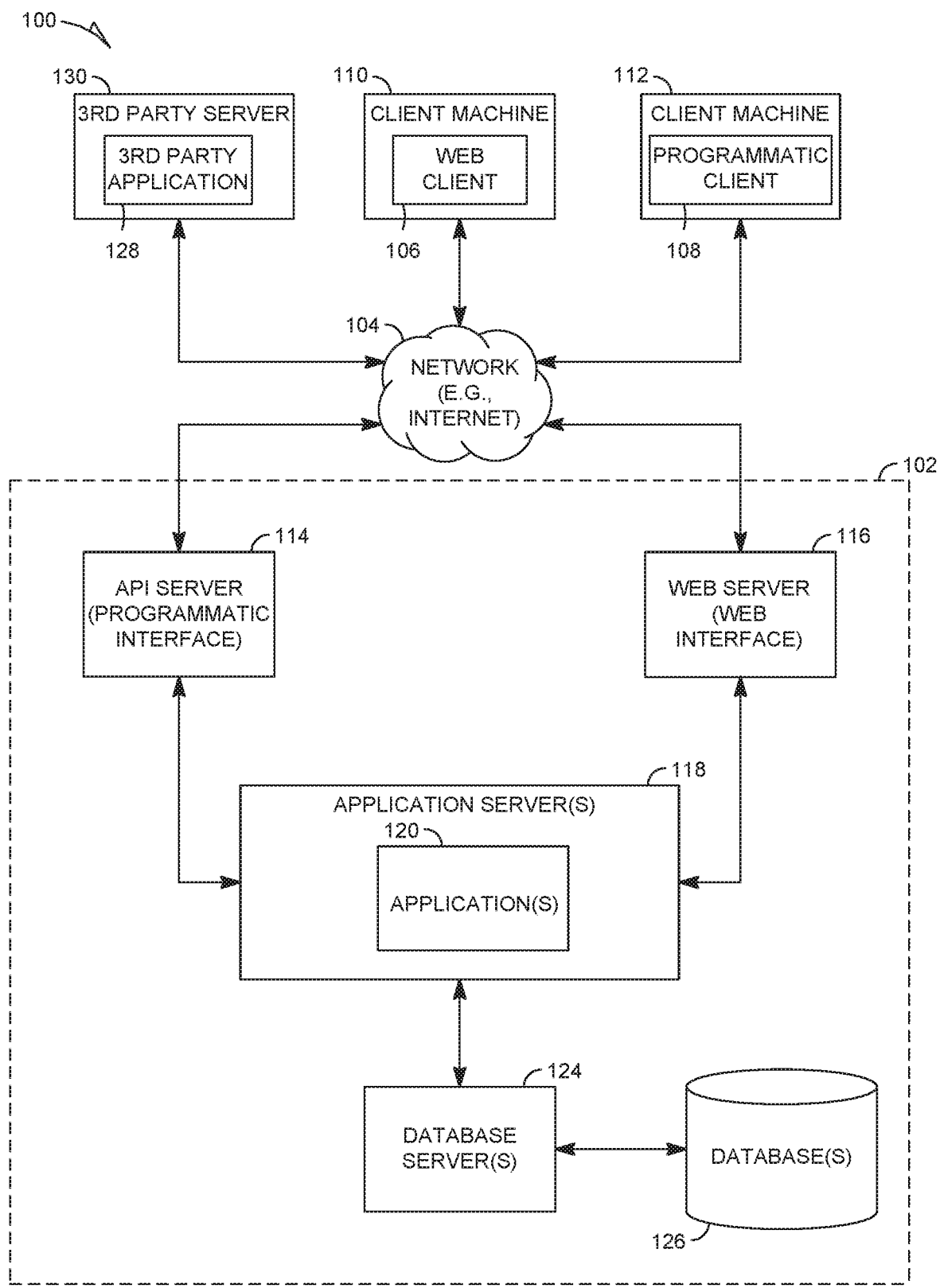
FIG. 1 is a block diagram illustrating a client-server system, in accordance with an example embodiment.

FIG. 1 is a block diagram illustrating a client-server system 100, in accordance with an example embodiment. A networked system 102 provides server-side functionality via a network 104 (e.g., the Internet or Wide Area Network (WAN)) to one or more clients. FIG. 1 illustrates, for example, a web client 106 (e.g., a browser) and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more applications 120. The application servers 118 are, in turn, shown to be coupled to one or more database servers 124 that facilitate access to one or more databases 126. While the applications 120 are shown in FIG. 1 to form part of the networked system 102, it will be appreciated that, in alternative embodiments, the applications 120 may form part of a service that is separate and distinct from the networked system 102.

Further, while the system 100 shown in FIG. 1 employs a client-server architecture, the present disclosure is of course not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the applications 120 via the programmatic interface provided by the API server 114.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more functions that are supported by the relevant applications of the networked system 102.

In some embodiments, any website referred to herein may comprise online content that may be rendered on a variety of devices, including but not limited to, a desktop personal computer, a laptop, and a mobile device (e.g., a tablet computer, smartphone, etc.). In this respect, any of these devices may be employed by a user to use the features of the present disclosure. In some embodiments, a user can use a mobile app on a mobile device (any of machines 110, 112, and 130 may be a mobile device) to access and browse online content, such as any of the online content disclosed herein. A mobile server (e.g., API server 114) may communicate with the mobile app and the application server(s) 118 in order to make the features of the present disclosure available on the mobile device.

Figure 2:
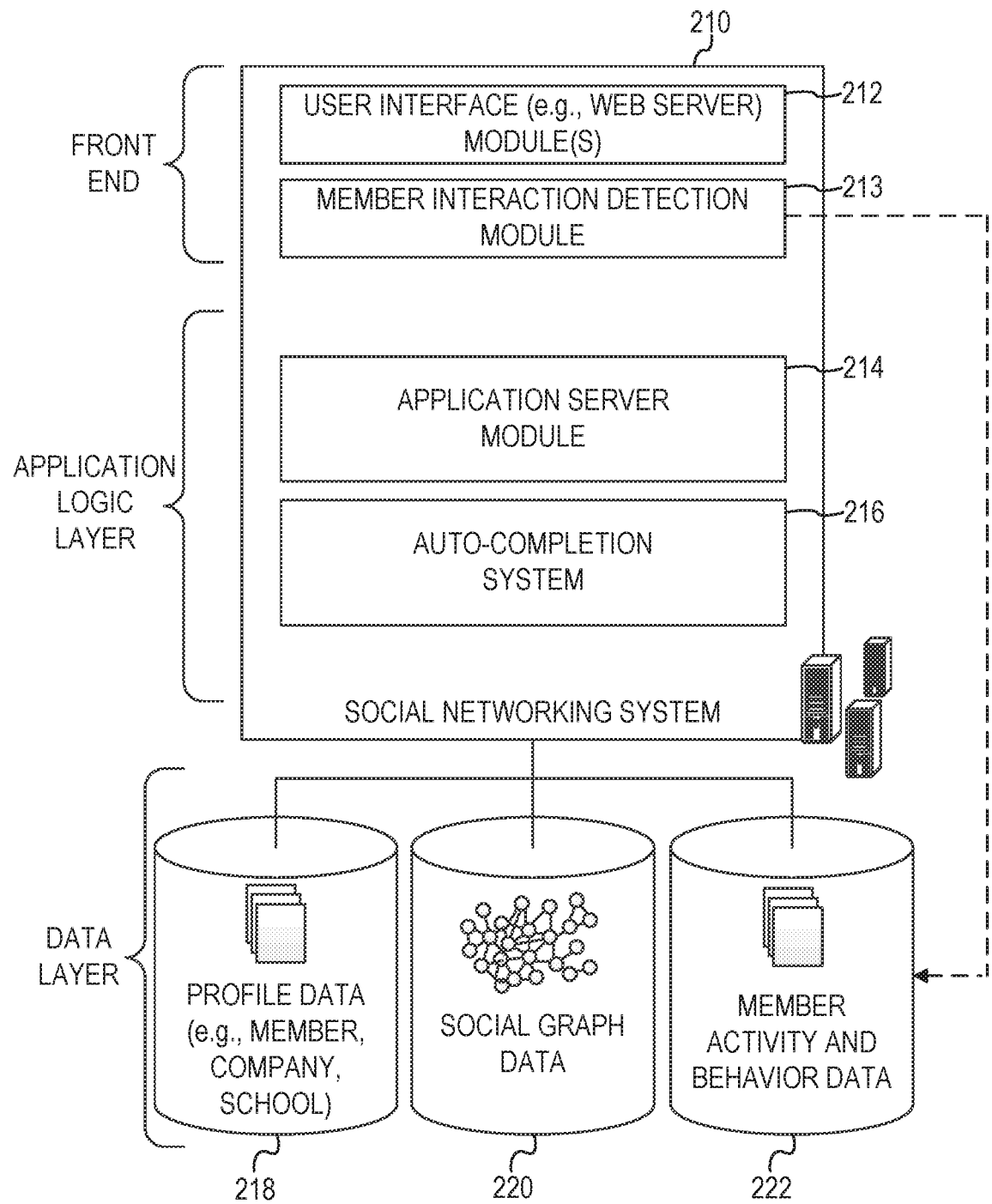
FIG. 2 is a block diagram showing the functional components of a social networking service within a networked system, in accordance with an example embodiment.

In some embodiments, the networked system 102 may comprise functional components of a social networking service. FIG. 2 is a block diagram showing the functional components of a social networking system 210, including a data processing module referred to herein as a auto-completion system 216, for use in social networking system 210, consistent with some embodiments of the present disclosure. In some embodiments, the auto-completion system 216 resides on application server(s) 118 in FIG. 1. However, it is contemplated that other configurations are also within the scope of the present disclosure.

As shown in FIG. 2, a front end may comprise a user interface module (e.g., a web server) 212, which receives requests from various client-computing devices, and communicates appropriate responses to the requesting client devices. For example, the user interface module(s) 212 may receive requests in the form of Hypertext Transfer Protocol (HTTP) requests, or other web-based, application programming interface (API) requests. In addition, a member interaction detection module 213 may be provided to detect various interactions that members have with different applications, services and content presented. As shown in FIG. 2, upon detecting a particular interaction, the member interaction detection module 213 logs the interaction, including the type of interaction and any meta-data relating to the interaction, in a member activity and behavior database 222.

An application logic layer may include one or more various application server modules 214, which, in conjunction with the user interface module(s) 212, generate various user interfaces (e.g., web pages) with data retrieved from various data sources in the data layer. With some embodiments, individual application server modules 214 are used to implement the functionality associated with various applications and/or services provided by the social networking service. In some example embodiments, the application logic layer includes the auto-completion system 216.

As shown in FIG. 2, a data layer may include several databases, such as a database 218 for storing profile data, including both member profile data and profile data for various organizations (e.g., companies, schools, etc.). Consistent with some embodiments, when a person initially registers to become a member of the social networking service, the person will be prompted to provide some personal information, such as his or her name, age (e.g., birthdate), gender, interests, contact information, home town, address, the names of the member's spouse and/or members, educational background (e.g., schools, majors, matriculation and/or graduation dates, etc.), employment history, skills, professional organizations, and so on. This information is stored, for example, in the database 218. Similarly, when a representative of an organization initially registers the organization with the social networking service, the representative may be prompted to provide certain information about the organization. This information may be stored, for example, in the database 218, or another database (not shown). In some example embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. In some example embodiments, importing or otherwise accessing data from one or more externally hosted data sources may enhance profile data for both members and organizations. For instance, with companies in particular, financial data may be imported from one or more external data sources and made part of a company's profile.

Once registered, a member may invite other members, or be invited by other members, to connect via the social networking service. A "connection" may require or indicate a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates (e.g., in an activity or content stream) or other messages published by the member being followed or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed, commonly referred to as an activity stream or content stream. In any case, the various associations and relationships that the members establish with other members, or with other entities and objects, are stored and maintained within a social graph, shown in FIG. 2 with database 220.

As members interact with the various applications, services, and content made available via the social networking system 210, the members' interactions and behavior (e.g., content viewed, links or buttons selected, messages responded to, etc.) may be tracked and information concerning the member's activities and behavior may be logged or stored, for example, as indicated in FIG. 2 by the database 222. This logged activity information may then be used by the auto-completion system 216. The members' interactions and behavior may also be tracked, stored, and used by the auto-completion system 216 residing on a client device, such as within a browser of the client device, as will be discussed in further detail below.

In some embodiments, databases 218, 220, and 222 may be incorporated into database(s) 126 in FIG. 1. However, other configurations are also within the scope of the present disclosure.

Although not shown, in some embodiments, the social networking system 210 provides an application programming interface (API) module via which applications and services can access various data and services provided or maintained by the social networking service. For example, using an API, an application may be able to request and/or receive one or more navigation recommendations. Such applications may be browser-based applications or may be operating system-specific. In particular, some applications may reside and execute (at least partially) on one or more mobile devices (e.g., phone, or tablet computing devices) with a mobile operating system. Furthermore, while in many cases the applications or services that leverage the API may be applications and services that are developed and maintained by the entity operating the social networking service, other than data privacy concerns, nothing prevents the API from being provided to the public or to certain third-parties under special arrangements, thereby making the navigation recommendations available to third party applications and services.

Although the auto-completion system 216 is referred to herein as being used in the context of a social networking service, it is contemplated that it may also be employed in the context of any website or online services. Additionally, although features of the present disclosure can be used or presented in the context of a web page, it is contemplated that any user interface view (e.g., a user interface on a mobile device or on desktop software) is within the scope of the present disclosure.

Figure 3:
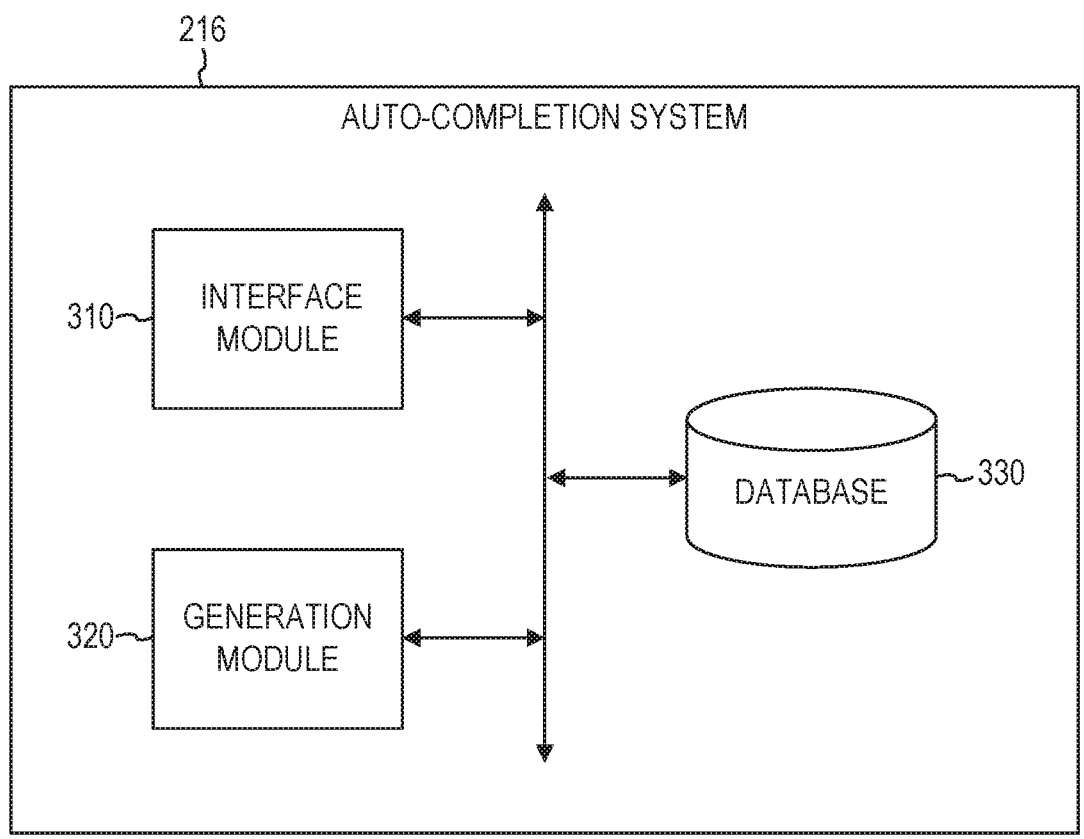
FIG. 3 is a block diagram illustrating an auto-completion system, in accordance with an example embodiment.

FIG. 3 is a block diagram illustrating components of the auto-completion system 216, in accordance with an example embodiment. In some embodiments, the auto-completion system 216 comprises any combination of one or more of an interface module 310, a generation module 320, and one or more database(s) 330. The modules 310 and 320 and the database(s) 330 can reside on a computer system, or other machine, having a memory and at least one processor (not shown). In some embodiments, the modules 310 and 320, and the database(s) 330 can be incorporated into the application server(s) 118 in FIG. 1. In some example embodiments, the database(s) 330 is incorporated into database(s) 126 in FIG. 1 and can include any combination of one or more of databases 218, 220, and 222 in FIG. 2. However, it is contemplated that other configurations of the modules 310 and 320 and the database(s) 330, are also within the scope of the present disclosure.

In some example embodiments, one or more of the modules 310 and 320 is configured to provide a variety of user interface functionality, such as generating user interfaces, interactively presenting user interfaces to the user, receiving information from the user (e.g., interactions with user interfaces), and so on. Presenting information to the user can include causing presentation of information to the user (e.g., communicating information to a device with instructions to present the information to the user). Information may be presented using a variety of means including visually displaying information and using other device outputs audio, tactile, and so forth). Similarly, information may be received via a variety of means including alphanumeric input or other device input (e.g., one or more touch screen, camera, tactile sensors, light sensors, infrared sensors, biometric sensors, microphone, gyroscope, accelerometer, other sensors, and so forth). In some example embodiments, one or more of the modules 310 and 320 is configured to receive user input. For example, one or more of the modules 310 and 320 can present one or more GUI elements (e.g., drop-down menu, selectable buttons, text field) with which a user can submit input.

In some example embodiments, one or more of the modules 310 and 320 is configured to perform various communication functions to facilitate the functionality described herein, such as by communicating with the social networking system 210 via the network 104 using a wired or wireless connection. Any combination of one or more of the modules 310 and 320 may also provide various web services or functions, such as retrieving information from the third party servers 130 and the social networking system 210. Information retrieved by the any of the modules 310 and 320 may include profile data corresponding to users and members of the social networking service of the social networking system 210.

Additionally, any combination of one or more of the modules 310 and 320 can provide various data functionality, such as exchanging information with database(s) 330 or servers. For example, any of the modules 310 and 320 can access member profiles that include profile data from the database(s) 330, as well as extract attributes and/or characteristics from the profile data of member profiles. Furthermore, the one or more of the modules 310 and 320 can access social graph data and member activity and behavior data from database(s) 330, as well as exchange information with third party servers 130, client machines 110, 112, and other sources of information.

Figure 4:
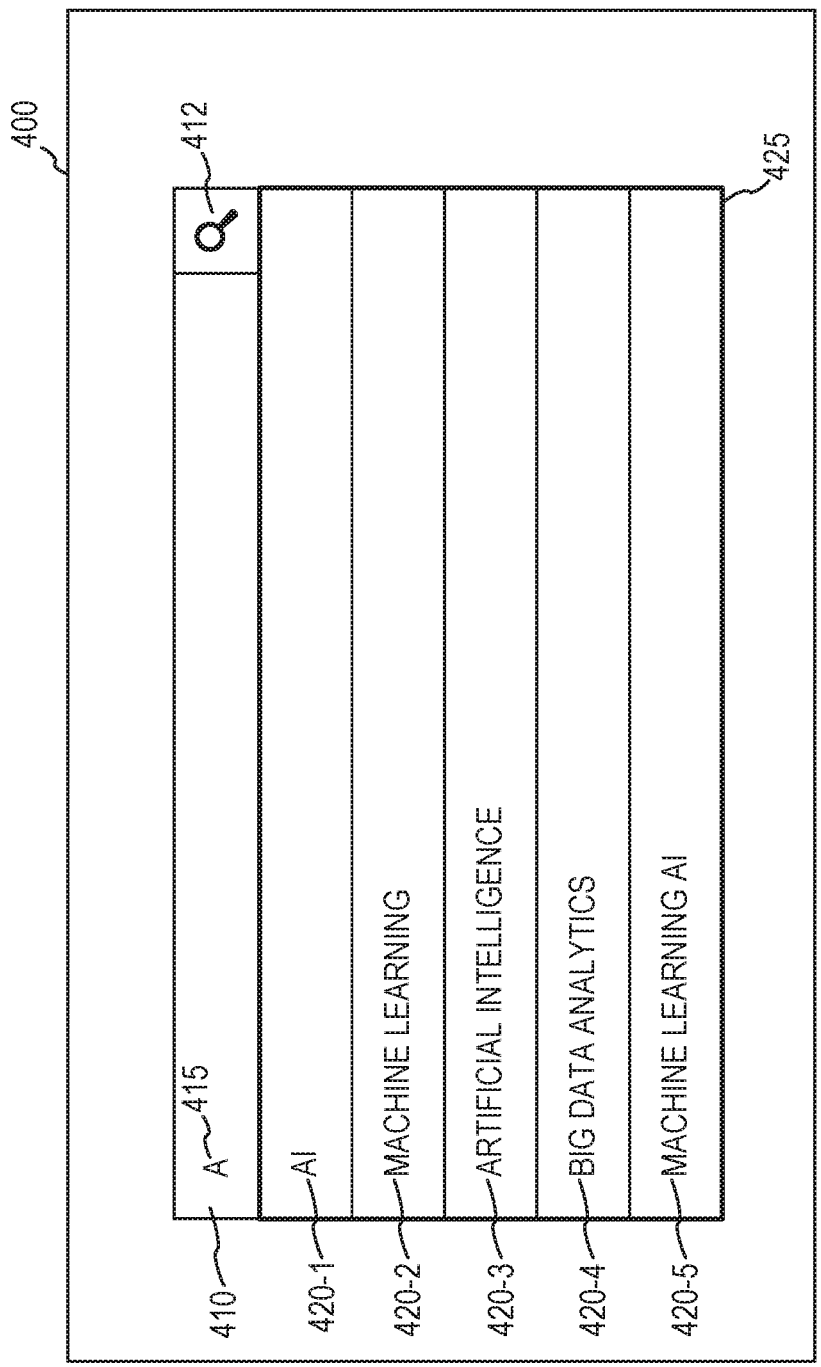
FIG. 4 illustrates a graphical user interface (GUI) providing auto-completion functionality for a search field of a search engine, in accordance with an example embodiment.

In some example embodiments, the interface module 310 is configured to detect user-entered text in a search field of a search engine, such as user-entered text having been entered via a user interface of a computing device of a user, and the generation module 320 is configured to, in response to or otherwise based on the detecting of the user-entered text in a search field, generate one or more auto-completion candidates for display in an auto-complete user interface element of the search field prior to the user-entered text being submitted by the user as part of a search query. FIG. 4 illustrates a graphical user interface (GUI) 400 providing auto-completion functionality for a search field 410 of a search engine of an online service (e.g., a search engine of the social networking system 210 in FIG. 2), in accordance with an example embodiment. In FIG. 4, a user has entered user-entered text 415 ("A") in the search field 410 via the GUI 400, and, in response to the interface module 310 detecting the user-entered text 415, the generation module 320 has generated and displayed auto-completion candidates 420, such as auto-completion candidate 420-1 ("AI"), auto-completion candidate 420-2 ("MACHINE LEARNING"), auto-completion candidate 420-3 ("ARTIFICIAL INTELLIGENCE"), auto-completion candidate 420-4 ("BIG DATA ANALYTICS"), and auto-completion candidate 420-5 ("MACHINE LEARNING AI").

In some example embodiments, each one of the auto-completion candidates 420 comprises predicted text absent from the user-entered text, as seen in the example embodiment of FIG. 4. For example, in FIG. 4, "I" is predicted text of auto-completion candidate 420-1, as it is not included in the user-entered text 415. Additionally, in some example embodiments, one or more of the auto-completion candidates 420 also comprises at least a portion of the user-entered text 415. For example, in FIG. 4, each auto-completion candidate 420 comprises the user-entered text "A." Furthermore, in some example embodiments, one or more of the auto-completion candidates 420 may comprise less than the entire portion of the user-entered text 415. For example, if the user-entered text 415 comprised the text "LINKEDIN SOFT," one or more of the auto-completion candidates 420 may be absent the "LINKEDIN" portion of the user-entered text 415 and only include the "SOFT" portion of the user-entered text 415 (e.g., "SOFTWARE ENGINEER" as a complete auto-completion candidate 420), or may be absent the "SOFT" portion of the user-entered text 415 and only include the "LINKEDIN" portion of the user-entered text 415 (e.g., "LINKEDIN DATA ANALYST" as a complete auto-completion candidate 420).

In some example embodiments, the generated auto-completion candidates 420 are displayed in an auto-completion user interface element 425 of the search field 410. The auto-completion user interface element 425 may comprise a corresponding selectable box for each auto-completion candidate 420. As the user enters text 415 in the search field 410, and before the user submits the entered-text 415 as a search query, such as by clicking or otherwise selecting a search icon 412 or another selectable user interface element, the auto-completion system 216 generates the auto-completion candidates 420 and displays them in the auto-completion user interface element 425 in association with the search field 410, such as in the form of a drop-down set of selectable boxes. It is contemplated that the generated auto-completion candidates 420 may be displayed in other forms as well.

In some example embodiments, the generation module 320 is configured to generate for display auto-completion candidates that do not suffer from the technical problems of other auto-completion systems. For example, other auto-completion systems are context agnostic, meaning that the same auto-completion candidates are shown to all members for the same user-entered text or query. For example, in other auto-completion systems, a first user whose last search query was "network architecture" and a second user whose last search query was "city design" will both be shown the same autocomplete results when they start their next query with "m." In contrast, the auto-completion system 216 of the present disclosure may use the search context to recommend "mesh topology" to the first user and "modern architecture" to the second one.

Additionally, other auto-completion systems suffer from low coherence, since their ranking algorithms are not semantic. As a result, for example, the user-entered text "learn" may lead to auto-completion candidates "machine learning," "learning," and "learning path," which have a low level of consistency with one another. Furthermore, other auto-completion systems suffer from impression bias, favouring historically popular queries, indirectly impacting perceived corpus diversity. Additionally, the performance for other auto-completion systems degrades for tail queries, naively removing auto-completion suggestions that lead to zero or low results (e.g., zero clicks or low number of clicks) for overall users.

As a solution to the technical problems of other auto-completion systems, in some example embodiments, the generation module 320 of the auto-completion system 216 is configured to, in response to or otherwise based on the detecting of the user-entered text, determine a context representation for the user-entered text based on a history of search queries submitted by the user within a particular amount of time before the user-entered text was entered by the user via the user interface, and then use the context representation to generate auto-completion candidate for display to the user. To achieve the advantages mentioned above, the auto-completion system 216 may learn semantic representations of queries and/or documents to tackle the technical problem of context insensitivity and lack of personalization.

In some example embodiments, the generation module 320 determines the context representation for the user-entered text by determining a corresponding query representation for each one of the plurality of search queries, and then combining the query representations of the plurality of search queries to form the context representation. In some example embodiments, the query representations for the plurality of search queries each comprise a corresponding query vector for the corresponding search query in the plurality of search queries, and the context representation comprises a combination of the query vectors of the plurality of search queries.

Common text-based vector representations lose out on the lexical gap between user queries and document terminology (e.g., the vocabulary of user queries is different from the vocabulary of the indexed documents). In some example embodiments, the generation module 320 employs a click-similarity model in which the query/document vector representations are learnt in the same semantic space with the initialization depending on a click-graph, such as a bipartite click-graph, that represents relationships between search queries and documents.

Figure 5A:
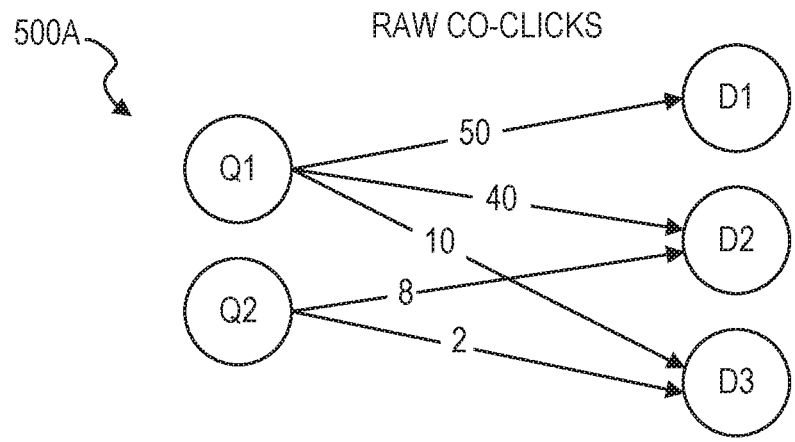
FIGS. 5A-5C illustrate bipartite graphs showing relationships between search queries and documents, in accordance with an example embodiment.
Figure 5B:
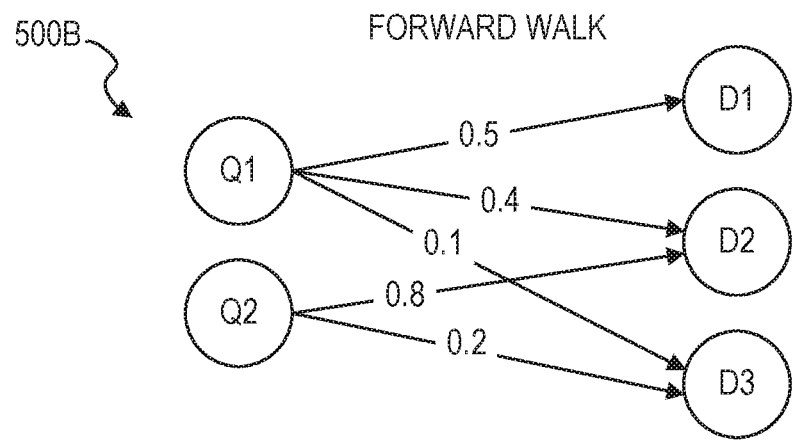
Figure 5C:
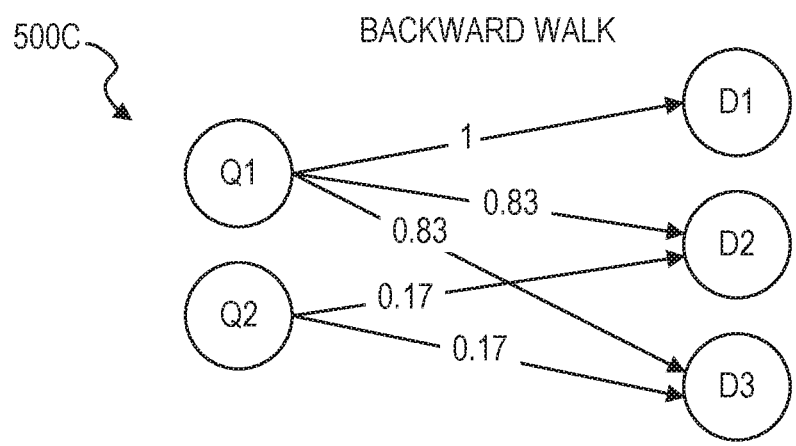

FIGS. 5A, 5B, and 5C illustrate bipartite graphs 500A, 500B, and 500C, respectively, showing relationships between search queries Q (Q1 and Q2) entered by one or more users and documents D (D1, D2, and D3), in accordance with an example embodiment. In FIGS. 5A, 5B, and 5C, an arrow from a search query Q to a document D represents a user selection (e.g., co-click) by a user to view the document Q that is displayed to the user as a search result of search query Q. In some example embodiments, these user selections are indicated by clickstream data that is accessed by the generation module 320. The search queries Q and the documents D represent nodes of the bipartite graphs 500A, 500B, and 500C, and the arrows represent edges linking the nodes.

In FIG. 5A, the bipartite graph 500A shows the raw co-click counts between the search queries Q1 and Q2 and the documents D1, D2, and D3. For example, the bipartite graph 500A shows that the document D1 was clicked 50 times as a search result of the search query Q1, the document D2 was clicked 40 times as a search result of the search query Q1, and the document D3 was clicked 10 times as a search result of the search query Q1, while the document D1 was clicked 0 times as a search result of the search query Q2, the document D2 was clicked 8 times as a search result of the search query Q2, and the document D3 was clicked 2 times as a search result of the search query Q2. These raw co-click counts may be used by the generation module 320 in generating the corresponding query representations, such as query vectors, for the plurality of search queries.

In some example embodiments, the generation module 320 is configured to weight the raw co-click counts in its generation of the query representations, such as by using forward walk weights and backward walk weights. The forward walk weight indicates a level of importance of a corresponding one of the selected documents for the corresponding search query, which may be represented by the following equation for the forward walk weight $w_f(i, j)$:

$$w_f(i, j) = \frac{c'(i, j)}{\sum_{k:(i,k)\in E'} c'(i, k)},$$

where the forward walk weight $w_f(i, j)$ represents the transition probability from node i to node j, thereby representing how important document j is for query i. The backward walk weight indicates a level of uniqueness of the corresponding search query for a corresponding one of the selected documents, which may be represented by the following equation for the backward walk weight $w_b(i, j)$:

$$w_b(i, j) = \frac{w_f(j, i)}{\sum_{k:(j,k)\in E'} w_f(j, k)},$$

where the backward walk weight $w_b(i, j)$ represents how unique query i is for document j, thereby penalizing head queries and helping tail queries. FIG. 5B shows the forward walk weights associated with the raw co-click counts shown in FIG. 5A, and FIG. 5C shows the backward walk weights associated with the raw co-click counts shown in FIG. 5A.

In some example embodiments, the generation module 320 is configured to generate the corresponding query representations based on clickstream data for the plurality of search queries, where the clickstream data indicates user selections of documents displayed as search results of the plurality of search queries, and the generating of the corresponding query representations comprises weighting the clickstream data using a forward walk weight and a backward walk weight, with the forward walk weight indicating a level of importance of a corresponding one of the selected documents for the corresponding search query, and the backward walk weight indicating a level of uniqueness of the corresponding search query for a corresponding one of the selected documents.

In some example embodiments, the generation module 320 employs vector propagation to generate the query representations. This vector propagation may comprise emptying vector matrices Q and D of size |Query|×V and |Doc|×V, where V is the vocabulary size (unique ½-grams) and each row represents a vector. The vector propagation starts with query or doc vocabulary space to initialize either Q or D with L2-norm smoothened tf-idf vectors, which gives $Q^{(0)}$ or $D^{(0)}$. The initialized vectors, Q or D, are weighted by the normalized edge weights and propagated to connected nodes on the other side of the graph (D or Q):

$$Q_i^{(n)} = \frac{1}{\left\|\sum_j^{|Doc|} C_{i,j} \cdot D_j^{(n-1)}\right\|_2} \sum_{j=1}^{|Doc|} C_{i,j} \cdot D_j^{(n-1)}$$

$$D_j^{(n)} = \frac{1}{\left\|\sum_{i=1}^{|Query|} C_{i,j} \cdot Q_i^{(n-1)}\right\|_2} \sum_{i=1}^{|Query|} C_{i,j} \cdot Q_i^{(n)}.$$

Through this propagation, the generation module 320 learns query and document vectors simultaneously in the same semantic space by adding latently related words and reweighting.

In some example embodiments, the generation module 320 stores the corresponding query representations in the database(s) 330, and then, when determining the corresponding query representations for each one of the plurality of search queries, retrieves the corresponding query representations from the database(s) 330. For example, the generation module 320 may generate query vectors, as previously discussed, and then load them on-heap inside searcher nodes of a search engine system. Then, with each request to a typeahead service of the online service implementing the search engine of the auto-completion system 216, the user's recent search history is passed down with the request as <query, timestamp> pairs. The generation module 320 then fetches the query vectors for all user queries and combines them to construct a single vector representing the user's context (e.g., the context of the user-entered text).

In some example embodiments, the generation module 320 is configured to generate a corresponding score for each one of a plurality of auto-completion candidates based on the auto-completion candidate and the context representation. Each one of the plurality of auto-completion candidates may comprise predicted text absent from the user-entered text. In some example embodiments, the generating of the corresponding score for each one of the plurality of auto-completion candidates comprises, for each one of the plurality of auto-completion candidates calculating a corresponding text match score based on a measurement of how much the user-entered text matches the one of the plurality of auto-completion candidates matches, calculating a corresponding representation similarity score based on a measurement of similarity between a candidate representation of the one of the auto-completion candidates and the context representation, and then generating the corresponding score for the one of the plurality of auto-completion candidates based on a combination of the corresponding text match score and the corresponding representation similarity score. The measurement of similarity between the candidate representation and the context representation may be a cosine similarity measurement. In some example embodiments, each corresponding score for an auto-completion candidate q may be a linear combination of its text match score and the cosine-similarity of the candidate query vector with the context vector:

$$\text{score}(q) = a * \text{text}(q) + (1-a) * \text{cosine}(q, \text{context}),$$

where a is a weight and context is the context vector. In some example, embodiments, the score(q) additionally or alternatively includes non-context features. For example, text(q) may be a combination of textual overlap of a current query prefix with and the auto-completion candidate, as well as a popularity score of the auto-completion candidate (e.g., a Most Popular Completion (MPC) score).

In some example embodiments, the generation module 320 is configured to select which auto-completion candidates to display in the auto-completion user interface element based on their corresponding scores. For example, the generation module 320 may rank the auto-completion candidates based on their corresponding scores, such as from highest score to lowest score, and then select the top N ranked auto-completion candidates for display, such as the top five highest ranked auto-completion candidates (e.g., the five auto-completion candidates with the highest scores). However, it is contemplated that other ways of selecting the auto-completion candidates based on their corresponding scores may also be employed. In response to, or otherwise based on, the selection of the auto-completion candidates by the generation module 320, the interface module 310 may display the selected auto-completion candidates in the auto-completion user interface element of the search field.

Figure 6:
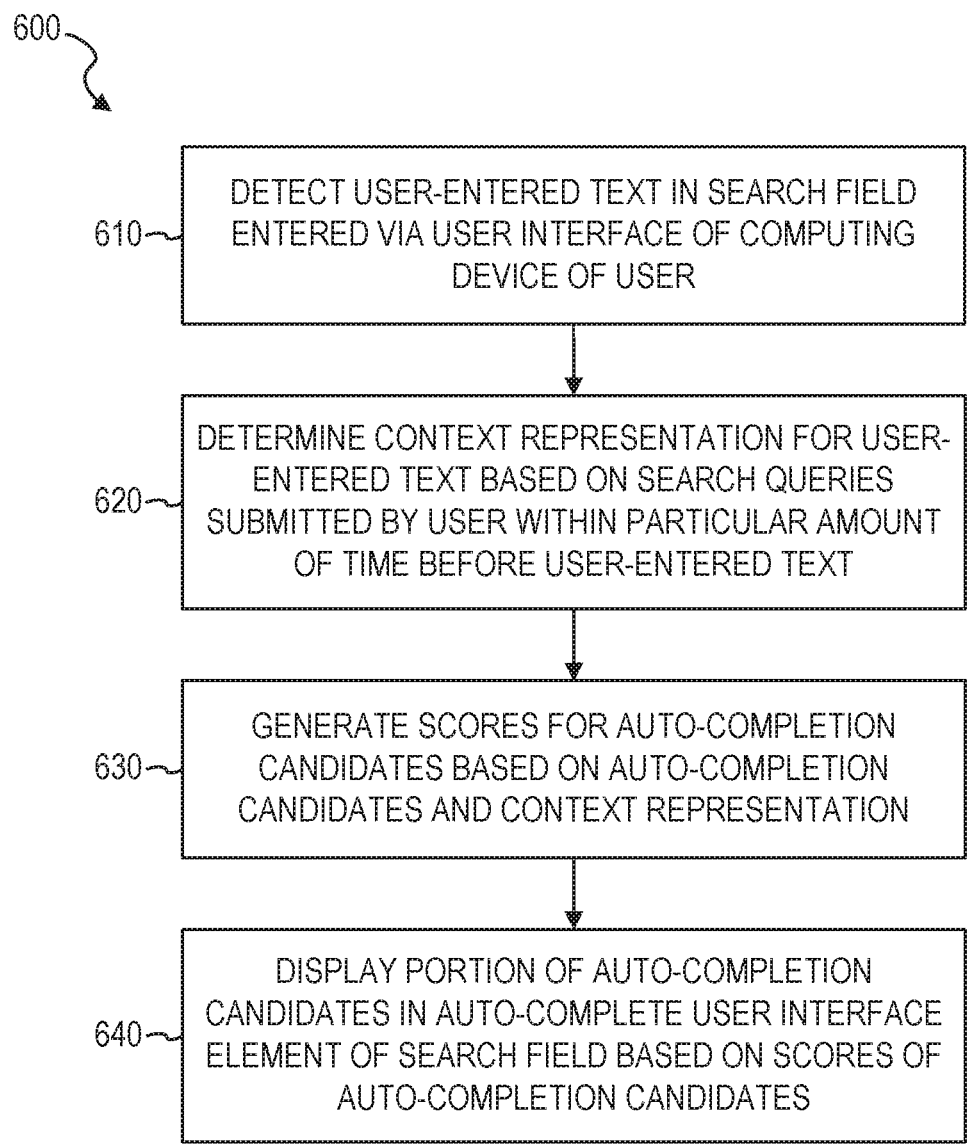
FIG. 6 is a flowchart illustrating a method of providing an auto-completion function for a search field of a search engine, in accordance with an example embodiment.

FIG. 6 is a flowchart illustrating a method 600 of providing an auto-completion function for a search field of a search engine, in accordance with an example embodiment. The method 600 can be performed by processing logic that can comprise hardware (e.g., circuitry, dedicated logic, programmable logic, microcode, etc.), software (e.g., instructions run on a processing device), or a combination thereof. In one implementation, the method 900 is performed by the auto-completion system 216 of FIGS. 2-3, or any combination of one or more of its modules, as described above.

At operation 610, the auto-completion system 216 detects user-entered text in a search field of a search engine. In some example embodiments, the user-entered text has been entered via a user interface of a computing device of a user. However, it is contemplated that the user-entered text may be entered by the user in other ways as well.

At operation 620, the auto-completion system 216, in response to the detecting of the user-entered text, determines a context representation for the user-entered text based on a plurality of search queries submitted by the user within a particular amount of time before the user-entered text was entered via the user interface. In some example embodiments, the context representation comprises a context vector for a context of the user-entered text. In some example embodiments, the determining the context representation for the user-entered text comprises determining a corresponding query representation for each one of the plurality of search queries, and then combining the query representations of the plurality of search queries to form the context representation. In some example embodiments, the query representations for the plurality of search queries each comprise a corresponding query vector for the corresponding search query in the plurality of search queries, and the context representation comprises a combination of the query vectors of the plurality of search queries. In some example embodiments, the determining of the corresponding query representation for each one of the plurality of search queries comprises retrieving the corresponding query representations from a database.

At operation 630, the auto-completion system 216 generates a corresponding score for each one of a plurality of auto-completion candidates based on the auto-completion candidate and the context representation. In some example embodiments, each one of the plurality of auto-completion candidates comprises predicted text absent from the user-entered text. In some example embodiments, the generating the corresponding score for each one of the plurality of auto-completion candidates comprises, for each one of the plurality of auto-completion candidates calculating a corresponding text match score based on a measurement of how much the user-entered text matches the one of the plurality of auto-completion candidates matches, calculating a corresponding representation similarity score based on a measurement of similarity between a candidate representation of the one of the auto-completion candidates and the context representation, and generating the corresponding score for the one of the plurality of auto-completion candidates based on a combination of the corresponding text match score and the corresponding representation similarity score. In some example embodiments, the measurement of similarity is a cosine similarity measurement. In some example embodiments, the combination of the corresponding text match score and the corresponding representation similarity score is a linear combination of the corresponding text match score with the corresponding representation similarity score. In some example embodiments, each one of the plurality of auto-completion candidates further comprises at least a portion of the user-entered text.

At operation 640, the auto-completion system 216 causes at least a portion of the plurality of auto-completion candidates to be displayed in an auto-complete user interface element of the search field within the user interface of the computing device of the user based on the corresponding scores of the at least a portion of the plurality of auto-completion candidates prior to the user-entered text being submitted by the user as part of a search query.

It is contemplated that any of the other features described within the present disclosure can be incorporated into the method 600.

Figure 7:
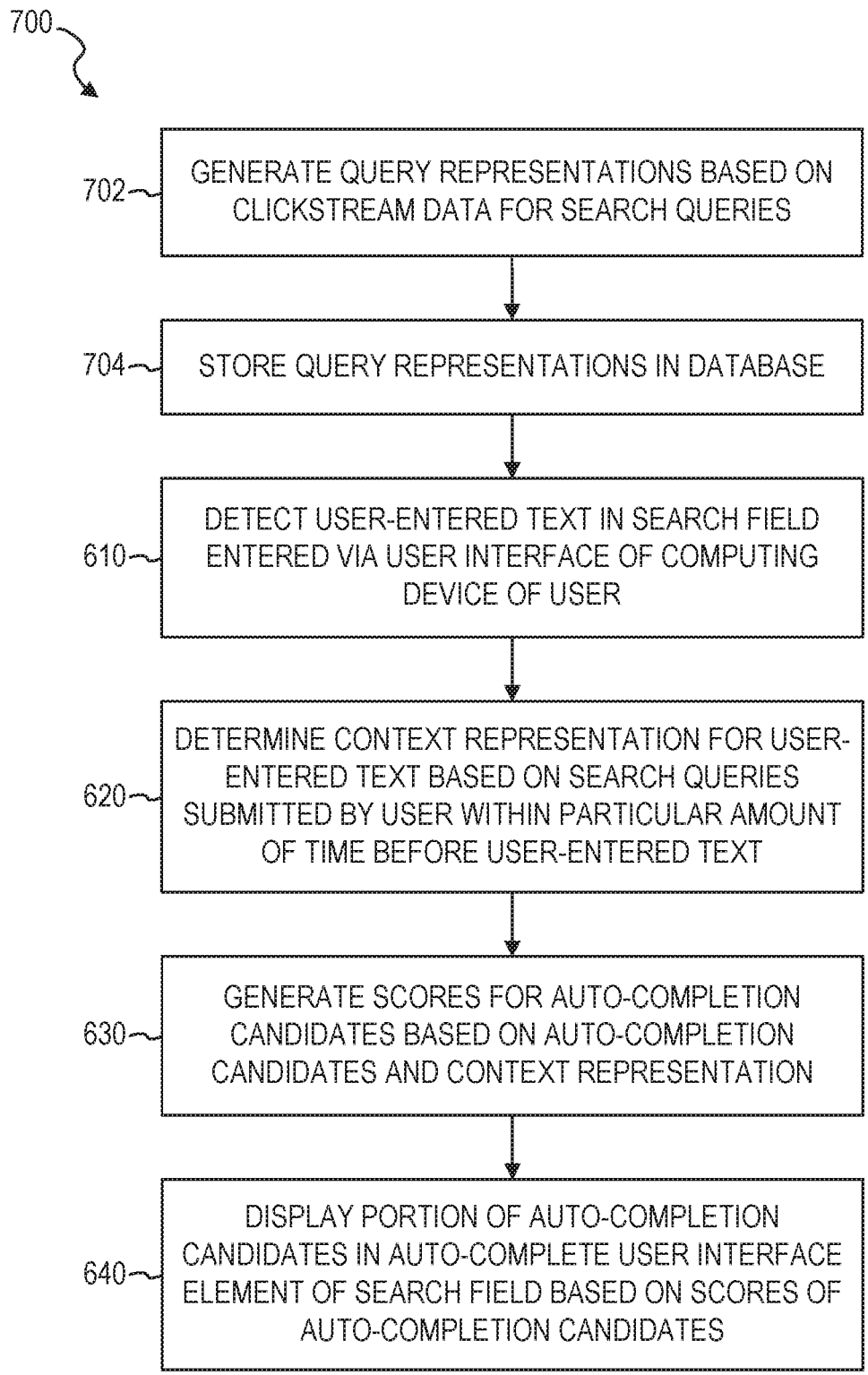
FIG. 7 is a flowchart illustrating another method of providing an auto-completion function for a search field of a search engine, in accordance with an example embodiment.

FIG. 7 is a flowchart illustrating another method 700 of providing an auto-completion function for a search field of a search engine, in accordance with an example embodiment. The method 700 can be performed by processing logic that can comprise hardware (e.g., circuitry, dedicated logic, programmable logic, microcode, etc.), software (e.g., instructions run on a processing device), or a combination thereof. In one implementation, the method 900 is performed by the auto-completion system 216 of FIGS. 2-3, or any combination of one or more of its modules, as described above. In some example embodiments, the method 700 comprises operations 702 and 704, and operations 702 and 704 are performed prior to the performance of operations 610, 620, 630, and 640 of the method 600 in FIG. 6.

At operation 702, the auto-completion system 216 generates the corresponding query representations based on clickstream data for the plurality of search queries. In some example embodiments, the clickstream data indicates user selections of documents displayed as search results of the plurality of search queries, and the generating of the corresponding query representations comprises weighting the clickstream data using a forward walk weight and a backward walk weight. In some example embodiments, the forward walk weight indicates a level of importance of a corresponding one of the selected documents for the corresponding search query, and the backward walk weight indicates a level of uniqueness of the corresponding search query for a corresponding one of the selected documents.

At operation 704, the auto-completion system 216 stores the corresponding query representations in the database. In some example embodiments, the stored query representations are subsequently retrieved for use in determining the context representation for the user-entered text in operation 620.

It is contemplated that any of the other features described within the present disclosure can be incorporated into the method 700.

Figure 8:
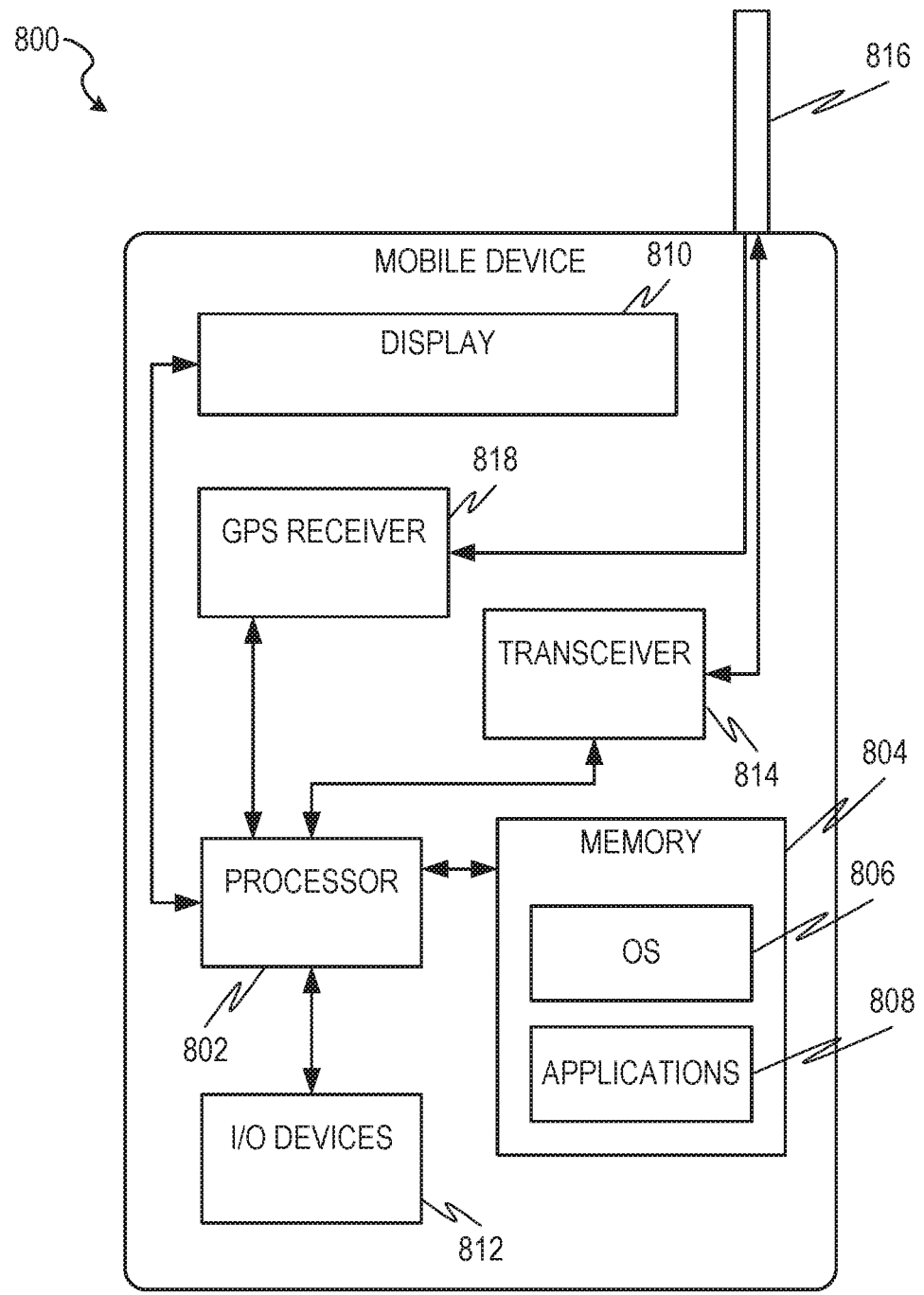
FIG. 8 is a block diagram illustrating a mobile device, in accordance with some example embodiments.

FIG. 8 is a block diagram illustrating a mobile device 800, according to an example embodiment. The mobile device 800 can include a processor 802. The processor 802 can be any of a variety of different types of commercially available processors suitable for mobile devices 800 (for example, an XScale architecture microprocessor, a Microprocessor without Interlocked Pipeline Stages (MIPS) architecture processor, or another type of processor). A memory 804, such as a random access memory (RAM), a Flash memory, or other type of memory, is typically accessible to the processor 802. The memory 804 can be adapted to store an operating system (OS) 806, as well as application programs 808, such as a mobile location-enabled application that can provide location-based services (LBSs) to a user. The processor 802 can be coupled, either directly or via appropriate intermediary hardware, to a display 810 and to one or more input/output (I/O) devices 812, such as a keypad, a touch panel sensor, a microphone, and the like. Similarly, in some embodiments, the processor 802 can be coupled to a transceiver 814 that interfaces with an antenna 816. The transceiver 814 can be configured to both transmit and receive cellular network signals, wireless data signals, or other types of signals via the antenna 816, depending on the nature of the mobile device 800. Further, in some configurations, a GPS receiver 818 can also make use of the antenna 816 to receive GPS signals.

Certain embodiments are described herein as including logic or a number of components, modules, or mechanisms, Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 9:
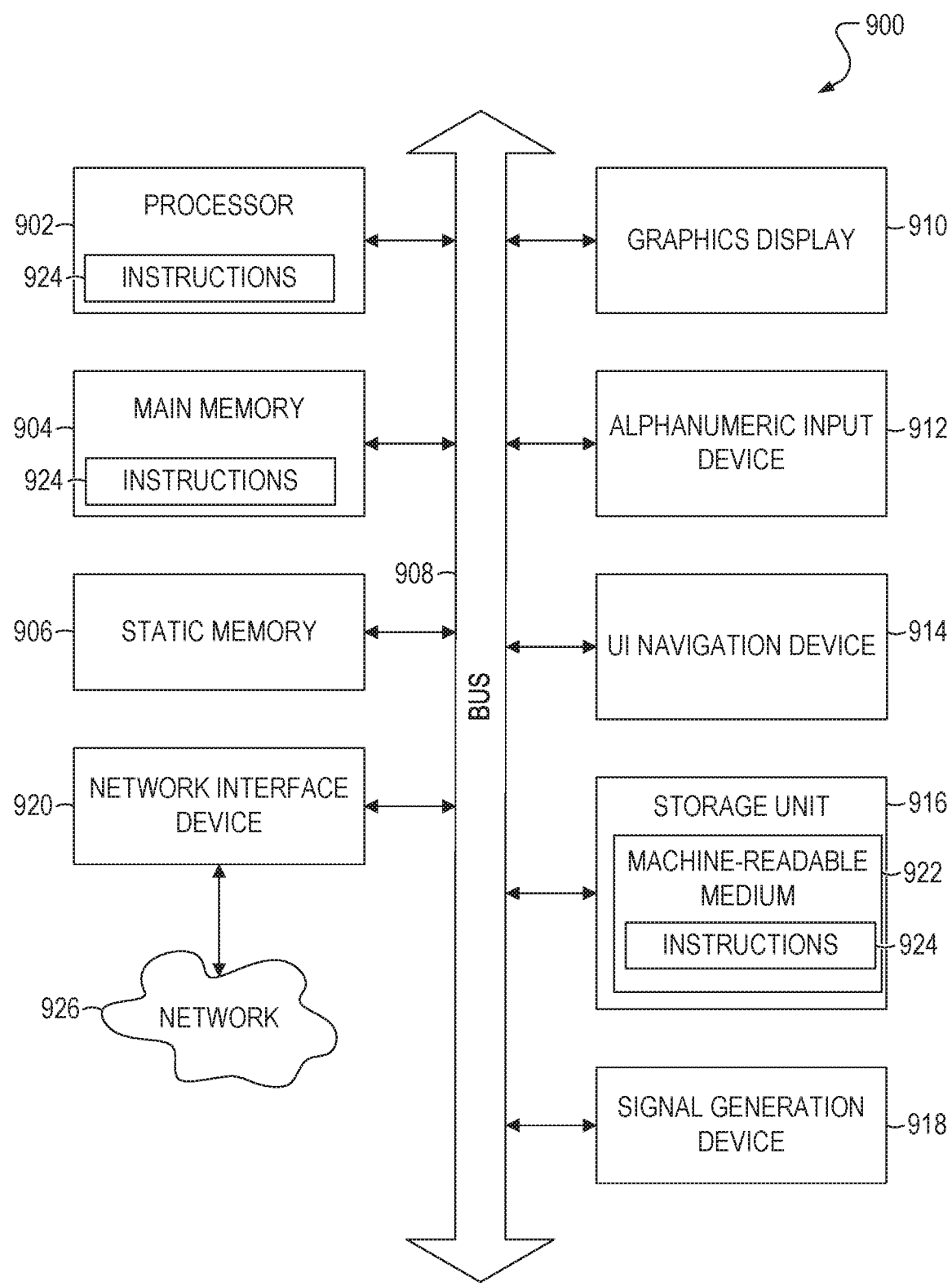
FIG. 9 is a block diagram of an example computer system on which methodologies described herein may be executed, in accordance with an example embodiment.

FIG. 9 is a block diagram of an example computer system 900 on which methodologies described herein may be executed, in accordance with an example embodiment. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904 and a static memory 906, which communicate with each other via a bus 908. The computer system 900 may further include a graphics display unit 910 (e.g., a liquid crystal display (LCD) or a cathode ray tube (CRT)). The computer system 900 also includes an alphanumeric input device 912 (e.g., a keyboard or a touch-sensitive display screen), a user interface (UI) navigation device 914 (e.g., a mouse), a storage unit 916, a signal generation device 918 (e.g., a speaker) and a network interface device 920.

The storage unit 916 includes a machine-readable medium 922 on which is stored one or more sets of instructions and data structures (e.g., software) 924 embodying or utilized by any one or more of the methodologies or functions described herein. The instructions 924 may also reside, completely or at least partially, within the main memory 904 and/or within the processor 902 during execution thereof by the computer system 900, the main memory 904 and the processor 902 also constituting machine-readable media.

While the machine-readable medium 922 is shown in an example embodiment to be a single medium, the term "machine-readable medium" may include a single medium or multiple media (e.g., a centralized or distributed database, and/or associated caches and servers) that store the one or more instructions 924 or data structures. The term "machine-readable medium" shall also lye taken to include any tangible medium that is capable of storing, encoding or carrying instructions (e.g., instructions 924) for execution by the machine and that cause the machine to perform any one or more of the methodologies of the present disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices; e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 924 may further be transmitted or received over a communications network 926 using a transmission medium. The instructions 924 may be transmitted using the network interface device 920 and any one of a number of well-known transfer protocols (e.g., HTTP). Examples of communication networks include a local area network ("LAN"), a wide area network ("WAN"), the Internet, mobile telephone networks, Plain Old Telephone Service (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

The following numbered examples are embodiments.

1. A computer-implemented method comprising:
   detecting, by a computer system having a memory and at least one hardware processor, user-entered text in a search field of a search engine, the user-entered text having been entered via a user interface of a computing device of a user;
   in response to the detecting of the user-entered text, determining, by the computer system, a context representation for the user-entered text based on a plurality of search queries submitted by the user within a particular amount of time before the user-entered text was entered via the user interface;
   generating, by the computer system, a corresponding score for each one of a plurality of auto-completion candidates based on the auto-completion candidate and the context representation, each one of the plurality of auto-completion candidates comprising predicted text absent from the user-entered text; and
   causing, by the computer system, at least a portion of the plurality of auto-completion candidates to be displayed in an auto-complete user interface element of the search field within the user interface of the computing device of the user based on the corresponding scores of the at least a portion of the plurality of auto-completion candidates prior to the user-entered text being submitted by the user as part of a search query.

2. The computer-implemented method of example 1, wherein the context representation comprises a context vector for a context of the user-entered text.

3. The computer-implemented method of example 1 or example 2, wherein the determining the context representation for the user-entered text comprises:
  determining a corresponding query representation for each one of the plurality of search queries; and
  combining the query representations of the plurality of search queries to form the context representation.

4. The computer-implemented method of example 3, wherein the query representations for the plurality of search queries each comprise a corresponding query vector for the corresponding search query in the plurality of search queries, and the context representation comprises a combination of the query vectors of the plurality of search queries.

5. The computer-implemented method of example 3 or example 4, wherein the determining of the corresponding query representation for each one of the plurality of search queries comprises retrieving the corresponding query representations from a database.

6. The computer-implemented method of example 5, further comprising:
  generating the corresponding query representations based on clickstream data for the plurality of search queries, the clickstream data indicating user selections of documents displayed as search results of the plurality of search queries, the generating the corresponding query representations comprising weighting the clickstream data using a forward walk weight and a backward walk weight, the forward walk weight indicating a level of importance of a corresponding one of the selected documents for the corresponding search query, and the backward walk weight indicating a level of uniqueness of the corresponding search query for a corresponding one of the selected documents; and
  storing the corresponding query representations in the database.

7. The computer-implemented method of any one of examples 1 to 6, wherein the generating the corresponding score for each one of the plurality of auto-completion candidates comprises, for each one of the plurality of auto-completion candidates:
  calculating a corresponding text match score based on a measurement of how much the user-entered text matches the one of the plurality of auto-completion candidates matches;
  calculating a corresponding representation similarity score based on a measurement of similarity between a candidate representation of the one of the auto-completion candidates and the context representation; and
  generating the corresponding score for the one of the plurality of auto-completion candidates based on a combination of the corresponding text match score and the corresponding representation similarity score.

8. The computer-implemented method of example 7, wherein the measurement of similarity is a cosine similarity measurement.

9. The computer-implemented method of example 7 or example 8, wherein the combination of the corresponding text match score and the corresponding representation similarity score is a linear combination of the corresponding text match score with the corresponding representation similarity score.

10. The computer-implemented method of any one of examples 1 to 9, wherein each one of the plurality of auto-completion candidates further comprises at least a portion of the user-entered text.

11. A system comprising:
  at least one processor; and
  a non-transitory computer-readable medium storing executable instructions that, when executed, cause the at least one processor to perform the method of any one of examples 1 to 10.

12. A non-transitory machine-readable storage medium, tangibly embodying a set of instructions that, when executed by at least one processor, causes the at least one processor to perform the method of any one of examples 1 to 10.

13. A machine-readable medium carrying a set of instructions that, when executed by at least one processor, causes the at least one processor to carry out the method of any one of examples 1 to 10.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled. Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method comprising:
  generating corresponding query representations based on clickstream data for a plurality of search queries, the clickstream data indicating user selections of content items displayed as search results of the plurality of search queries, the generating the corresponding query representations comprising weighting the clickstream data using a forward walk weight and a backward walk weight, the forward walk weight indicating a level of importance of a corresponding one of the selected content items for the corresponding search query, and the backward walk weight indicating a level of uniqueness of the corresponding search query for a corresponding one of the selected content items;
  storing the corresponding query representations in a database;
  detecting, by a computer system having a memory and at least one hardware processor, user-entered text in a search field of a search engine, the user-entered text having been entered via a user interface of a computing device of a user;
  in response to the detecting of the user-entered text, determining, by the computer system, a context representation for the user-entered text based on the plurality of search queries, the plurality of search queries having been submitted by the user within a particular amount of time before the user-entered text was entered via the user interface, the determining the context representation for the user-entered text comprising:
retrieving the corresponding query representations for each one of the plurality of search queries from the database; and
combining the query representations of the plurality of search queries to form the context representation;
generating, by the computer system, a corresponding score for each one of a plurality of auto-completion candidates based on the one of the plurality of auto-completion candidates and the context representation, each one of the plurality of auto-completion candidates comprising predicted text absent from the user-entered text; and
causing, by the computer system, at least a portion of the plurality of auto-completion candidates to be displayed in an auto-complete user interface element of the search field within the user interface of the computing device of the user based on the corresponding scores of the at least a portion of the plurality of auto-completion candidates prior to the user-entered text being submitted by the user as part of a search query.

2. The computer-implemented method of claim 1, wherein the context representation comprises a context vector for a context of the user-entered text.

3. The computer-implemented method of claim 1, wherein the query representations for the plurality of search queries each comprise a corresponding query vector for the corresponding search query in the plurality of search queries, and the context representation comprises a combination of the query vectors of the plurality of search queries.

4. The computer-implemented method of claim 1, wherein the generating the corresponding score for each one of the plurality of auto-completion candidates comprises, for each one of the plurality of auto-completion candidates:
calculating a corresponding text match score based on a measurement of an amount that the user-entered text matches the one of the plurality of auto-completion candidates matches;
calculating a corresponding representation similarity score based on a measurement of similarity between a candidate representation of the one of the auto-completion candidates and the context representation; and
generating the corresponding score for the one of the plurality of auto-completion candidates based on a combination of the corresponding text match score and the corresponding representation similarity score.

5. The computer-implemented method of claim 4, wherein the measurement of similarity is a cosine similarity measurement.

6. The computer-implemented method of claim 4, wherein the combination of the corresponding text match score and the corresponding representation similarity score is a linear combination of the corresponding text match score with the corresponding representation similarity score.

7. The computer-implemented method of claim 1, wherein each one of the plurality of auto-completion candidates further comprises at least a portion of the user-entered text.

8. A system comprising:
at least one hardware processor; and
a non-transitory machine-readable medium embodying a set of instructions that, when executed by the at least one hardware processor, cause the at least one processor to perform operations, the operations comprising:
generating corresponding query representations based on clickstream data for a plurality of search queries, the clickstream data indicating user selections of content items displayed as search results of the plurality of search queries, the generating the corresponding query representations comprising weighting the clickstream data using a forward walk weight and a backward walk weight, the forward walk weight indicating a level of importance of a corresponding one of the selected content items for the corresponding search query, and the backward walk weight indicating a level of uniqueness of the corresponding search query for a corresponding one of the selected content items;
storing the corresponding query representations in a database;
detecting user-entered text in a search field of a search engine, the user-entered text having been entered via a user interface of a computing device of a user;
in response to the detecting of the user-entered text, determining a context representation for the user-entered text based on the plurality of search queries, the plurality of search queries having been submitted by the user within a particular amount of time before the user-entered text was entered via the user interface, the determining the context representation for the user-entered text comprising:
retrieving the corresponding query representations for each one of the plurality of search queries from the database; and
combining the query representations of the plurality of search queries to form the context representation;
generating a corresponding score for each one of a plurality of auto-completion candidates based on the one of the plurality of auto-completion candidates and the context representation, each one of the plurality of auto-completion candidates comprising predicted text absent from the user-entered text; and
causing at least a portion of the plurality of auto-completion candidates to be displayed in an auto-complete user interface element of the search field within the user interface of the computing device of the user based on the corresponding scores of the at least a portion of the plurality of auto-completion candidates prior to the user-entered text being submitted by the user as part of a search query.

9. The system of claim 8, wherein the context representation comprises a context vector for a context of the user-entered text.

10. The system of claim 8, wherein the query representations for the plurality of search queries each comprise a corresponding query vector for the corresponding search query in the plurality of search queries, and the context representation comprises a combination of the query vectors of the plurality of search queries.

11. The system of claim 8, wherein the generating the corresponding score for each one of the plurality of auto-completion candidates comprises, for each one of the plurality of auto-completion candidates:
calculating a corresponding text match score based on a measurement of an amount that the user-entered text matches the one of the plurality of auto-completion candidates matches;
calculating a corresponding representation similarity score based on a measurement of similarity between a candidate representation of the one of the auto-completion candidates and the context representation; and generating the corresponding score for the one of the plurality of auto-completion candidates based on a combination of the corresponding text match score and the corresponding representation similarity score.

12. The system of claim 8, wherein each one of the plurality of auto-completion candidates further comprises at least a portion of the user-entered text.

13. A non-transitory machine-readable medium embodying a set of instructions that, when executed by at least one hardware processor, cause the processor to perform operations, the operations comprising:

generating corresponding query representations based on clickstream data for a plurality of search queries, the clickstream data indicating user selections of content items displayed as search results of the plurality of search queries, the generating the corresponding query representations comprising weighting the clickstream data using a forward walk weight and a backward walk weight, the forward walk weight indicating a level of importance of a corresponding one of the selected content items for the corresponding search query, and the backward walk weight indicating a level of uniqueness of the corresponding search query for a corresponding one of the selected content items;

storing the corresponding query representations in a database;

detecting user-entered text in a search field of a search engine, the user-entered text having been entered via a user interface of a computing device of a user;

in response to the detecting of the user-entered text, determining a context representation for the user-entered text based on the plurality of search queries, the plurality of search queries having been submitted by the user within a particular amount of time before the user-entered text was entered via the user interface, the determining the context representation for the user-entered text comprising:

retrieving the corresponding query representations for each one of the plurality of search queries from the database; and combining the query representations of the plurality of search queries to form the context representation;

generating a corresponding score for each one of a plurality of auto-completion candidates based on the one of the plurality of auto-completion candidates and the context representation, each one of the plurality of auto-completion candidates comprising predicted text absent from the user-entered text; and causing at least a portion of the plurality of auto-completion candidates to be displayed in an auto-complete user interface element of the search field within the user interface of the computing device of the user based on the corresponding scores of the at least a portion of the plurality of auto-completion candidates prior to the user-entered text being submitted by the user as part of a search query.

14. The non-transitory machine-readable medium of claim 13, wherein the context representation comprises a context vector for a context of the user-entered text.

15. The non-transitory machine-readable medium of claim 13, wherein the query representations for the plurality of search queries each comprise a corresponding query vector for the corresponding search query in the plurality of search queries, and the context representation comprises a combination of the query vectors of the plurality of search queries.

16. The non-transitory machine-readable medium of claim 13, wherein the generating the corresponding score for each one of the plurality of auto-completion candidates comprises, for each one of the plurality of auto-completion candidates:

calculating a corresponding text match score based on a measurement of an amount that the user-entered text matches the one of the plurality of auto-completion candidates matches;

calculating a corresponding representation similarity score based on a measurement of similarity between a candidate representation of the one of the auto-completion candidates and the context representation; and generating the corresponding score for the one of the plurality of auto-completion candidates based on a combination of the corresponding text match score and the corresponding representation similarity score.

17. The non-transitory machine-readable medium of claim 16, wherein the measurement of similarity is a cosine similarity measurement.

18. The non-transitory machine-readable medium of claim 16, wherein the combination of the corresponding text match score and the corresponding representation similarity score is a linear combination of the corresponding text match score with the corresponding representation similarity score.

19. The non-transitory machine-readable medium of claim 13, wherein each one of the plurality of auto-completion candidates further comprises at least a portion of the user-entered text.

* * * * *